United States Patent
Tun et al.

(10) Patent No.: US 12,359,654 B2
(45) Date of Patent: Jul. 15, 2025

(54) ACTUATOR ASSEMBLIES

(71) Applicant: CAMBRIDGE MECHATRONICS LIMITED, Cambridge (GB)

(72) Inventors: Jason Tun, Cambridge (GB); Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 200 days.

(21) Appl. No.: 18/270,032

(22) PCT Filed: Dec. 31, 2021

(86) PCT No.: PCT/GB2021/053453
§ 371 (c)(1),
(2) Date: Jun. 28, 2023

(87) PCT Pub. No.: WO2022/144557
PCT Pub. Date: Jul. 7, 2022

(65) Prior Publication Data
US 2024/0077064 A1 Mar. 7, 2024

(30) Foreign Application Priority Data
Dec. 31, 2020 (GB) .................................. 2020882

(51) Int. Cl.
*F03G 7/06* (2006.01)
*G03B 5/00* (2021.01)
*G03B 13/34* (2021.01)

(52) U.S. Cl.
CPC ....... *F03G 7/06143* (2021.08); *F03G 7/0645* (2021.08); *F03G 7/066* (2021.08);
(Continued)

(58) Field of Classification Search
CPC . G02B 7/09; G02B 7/023; G02B 7/02; G02B 7/08; G02B 7/021; G02B 27/646;
(Continued)

(56) References Cited

U.S. PATENT DOCUMENTS 8,175,449 B2 * 5/2012 Kubo ...................... F03G 7/065
396/85
8,559,803 B2 * 10/2013 Huang ................. H04N 23/687
396/52

(Continued)

FOREIGN PATENT DOCUMENTS

| EP | 2926191 A1 | 10/2015 |
| JP | 2007-060530 A | 3/2007 |
| WO | 2014/083318 A1 | 6/2014 |

OTHER PUBLICATIONS

Examination and Search Report of GB Application GB2020882.3 dated May 26, 2021.
(Continued)

*Primary Examiner* — Pritham D Prabhakher
(74) *Attorney, Agent, or Firm* — Van Hoven PC; Stefan D. Osterbur; Joshua Van Hoven

(57) ABSTRACT

Actuator assemblies and methods of operating actuator assemblies are provided, in particular with the aim of reducing bearing jitter. In one approach an actuator assembly (1) is provided which has: a support element (4); a movable element (20) movable relative to the support element; an SMA component (80) connected between the movable element and the support element and arranged to cause movement of the movable element relative to the support element; a bearing (100) arranged to guide the movement of the movable element; and a controller (30) arranged to control energy supplied to the SMA component to thereby cause contraction and/or relaxation of the SMA component and to control movement of the movable element relative to the (Continued)

support element in a first direction so as to provide an actuation function, wherein the controller is arranged to, at least whilst the movable element starts to move in the first direction, control the movable element to cause it to be moving in a second direction orthogonal to the first direction.

15 Claims, 2 Drawing Sheets

(52) U.S. Cl.
CPC ............... *G03B 5/00* (2013.01); *G03B 13/34* (2013.01); *G03B 2205/0007* (2013.01); *G03B 2205/0046* (2013.01); *G03B 2205/0076* (2013.01)

(58) Field of Classification Search
CPC .. F16M 13/022; H05K 7/1422; H05K 7/1417; H05K 1/028; F16F 15/005; F16F 1/027; F03G 7/06143; F03G 7/0645; F03G 7/0665
USPC .................................................... 348/207.99
See application file for complete search history.

(56) References Cited

U.S. PATENT DOCUMENTS

| | | | |
|---|---|---|---|
| 8,588,598 B2* | 11/2013 | Topliss | F03G 7/062 396/73 |
| 8,866,918 B2* | 10/2014 | Gregory | F03G 7/062 348/208.99 |
| 9,366,879 B1* | 6/2016 | Miller | G02B 7/09 |
| 9,609,219 B2* | 3/2017 | Howarth | F03G 7/06143 |
| 10,175,499 B2* | 1/2019 | Howarth | F03G 7/06143 |
| 11,526,021 B2* | 12/2022 | Lai | F03G 7/0636 |
| 11,953,701 B2* | 4/2024 | Eddington | F03G 7/065 |
| 2011/0179786 A1* | 7/2011 | Topliss | G03B 3/10 60/527 |
| 2014/0055630 A1* | 2/2014 | Gregory | H04N 23/6812 348/208.2 |
| 2015/0055220 A1* | 2/2015 | Lim | G02B 27/646 359/557 |
| 2015/0200612 A1* | 7/2015 | Matsukawa | H10N 30/2023 310/323.01 |
| 2016/0154250 A1 | 6/2016 | Miller | |
| 2016/0258425 A1* | 9/2016 | Ladwig | G02B 27/646 |
| 2016/0330375 A1* | 11/2016 | Sekimoto | H04N 23/55 |
| 2017/0075192 A1 | 3/2017 | Brown et al. | |
| 2017/0219842 A1* | 8/2017 | Howarth | H04N 23/57 |
| 2019/0086686 A1 | 3/2019 | Lai et al. | |

OTHER PUBLICATIONS

International Search Report and Written Opinion received for PCT Patent Application No. PCT/GB21/053453, mailed on Mar. 5, 2022, 15 pages.

* cited by examiner

ACTUATOR ASSEMBLIES

CROSS-REFERENCE TO RELATED APPLICATIONS

This application is a national stage application under 35 U.S.C. § 371 of International Application No. PCT/GB2021/053453, filed Dec. 31, 2021, which claims priority of GB Patent Application 2020882.3, filed Dec. 31, 2020, the disclosures of each of which are hereby incorporated by reference herein in their entireties.

The present techniques generally relate to actuator assemblies, and particularly, but not exclusively, to assemblies which use shape memory alloy (SMA) actuator wires to drive the motion of a movable element.

There are a variety of apparatuses in which it is desired to provide control of a movable element. SMA wires may be advantageous as actuators in such apparatuses, for example due to their high energy density which means that the SMA actuator required to apply a given force to the movable element can be relatively small.

One type of apparatus in which SMA wire is known for use as an actuator is in miniature cameras, for example those used in smartphones or other portable electronic devices. WO 2011/104518 discloses examples of SMA actuation apparatuses which are suitable for use in miniature cameras.

When the direction of motion of an actuator is controlled by plain bearings and the actuator motion is driven by the contraction or extension of an SMA actuator wire, the actuator position can be subject to minor irregular variations or unsteadiness, generally referred to as "jitter".

An object of the present techniques is to provide actuator assemblies and methods of operating actuator assemblies with reduced jitter.

A further object of the present techniques is to increase the precision of an actuator.

A further object of the present techniques is to provide actuator assemblies which can reduce blur when used for optical image stabilisation.

A first approach of the present techniques provides an actuator assembly having: a support element; a movable element movable relative to the support element; an SMA component connected between the movable element and the support element and arranged to cause movement of the movable element relative to the support element; a bearing arranged to guide the movement of the movable element; and a controller arranged to control energy supplied to the SMA component to thereby cause contraction and/or relaxation of the SMA component and to control movement of the movable element relative to the support element in a first direction so as to provide an actuation function, wherein the controller is arranged to, at least whilst the movable element starts to move in the first direction, control the movable element to cause it to be moving in a second direction orthogonal to the first direction.

For the purposes of the present techniques, the second direction is considered to be orthogonal to the first direction if movement in the second direction does not change the position of the movable element in the first direction. Thus, movement in the second direction in question may be orthogonal by being linear movement in a direction perpendicular to the first direction and/or by being rotational movement about an axis perpendicular to the first direction.

Thus, in certain embodiments, the actuator assembly has a principal axis and the first direction is (any direction) perpendicular to said principal axis and the second direction is rotation about an axis parallel to said principal axis.

By causing the movable element to move in the second direction, which is orthogonal to the first direction, the movable element can be kept in motion whilst the actuator is powered, thus meaning that any motion in the first direction caused by the SMA actuator is affected only by the dynamic coefficient of friction and any jitter can thus be reduced and preferably eliminated.

The actuation function may correspond to optical image stabilisation in a camera apparatus.

The bearing may be arranged to constrain movement of the movable element to directions in a predetermined plane.

In certain arrangements there may be a plurality of SMA actuator components and the controller may be arranged to control the movable element to cause it to move in the second direction by causing contraction and/or relaxation of one or more of said components. Thus the controller may use actuator components which are different to those used to cause motion in the first direction to cause the motion in the second direction, or may use one or more actuator components which are the same as one or more of those used to cause motion in the first direction to cause the motion in the second direction.

There may be a predetermined maximum of total power that can be supplied to said components, and the controller may be further arranged to control the energy supplied to the SMA actuator components such that, if the power required to cause the desired movement in both the first and second directions exceeds said maximum, the controller is arranged to allocate the power preferentially to the component or components used to control movement in the first direction over the component or components used to cause the movable element to move in the second direction.

Thus the controller can manage the power budget of the actuator assembly and prioritise motion in the first direction (which is the desired motion) of the movable element over the jitter-reduction functionality.

In certain arrangements, the controller is arranged to control the movable element to cause it to oscillate by moving in the second direction and a third direction opposite to the second direction. The third direction is also orthogonal to the first direction, such that the position of the movable element in the first direction is unaffected by this oscillatory motion. This may, for example, be lateral oscillatory motion or rotational oscillatory motion.

The frequency of said oscillation is preferably between 10-200 Hz and more preferably between 20-200 Hz.

The controller may be arranged to cause the movable element to be moving in the second direction whenever the movable element is not moving in the first direction. The controller may be arranged to cause the movable element to be moving in the second direction also whilst the movable element is moving in the first direction. The controller may be arranged to cause the movable element to be continuously moving in the second direction when in a particular operating mode.

Desirably the frequency of said oscillation is chosen so that it exceeds the frequency of the likely jitter. The frequency of jitter in typical bearings of the type used in SMA actuator assemblies is normally below 10 Hz and, in almost all situations, below 20 Hz.

Oscillation at too high a frequency will result in a reduction in the amplitude of the oscillatory motion due to a lack of time for the actuator components driving the oscillation to cool between each actuation. If the amplitude of the orthogonal/oscillatory motion is too low, the movable element may be effectively static relative to the bearing, or at least still within the domain in which the static coefficient of friction has an influence on the motion of the bearing, and thus the advantageous effects of the orthogonal/oscillatory motion may not be achieved or may be reduced.

Oscillatory motion may be beneficial as it allows for orthogonal motion of the movable element to be maintained over a relatively long period of time whilst only providing for a relatively small range of movement in the second and third directions. This may be particularly beneficial where the range of available movement is restricted, for example due to the design constraints on the apparatus, or due to the size and/or positioning of the actuators causing the motion in the second and third directions.

The apparatus of this approach may include any combination of some, all or none of the above-described preferred and optional features.

A second approach of the present techniques provides a method of controlling an actuator assembly, the actuator assembly having: a support element; a movable element movable relative to the support element; an SMA component connected between the movable element and the support element and arranged to cause movement of the movable element relative to the support element; and a bearing arranged to guide the movement of the movable element, wherein the method includes the steps of: supplying energy to the actuator to control movement of the movable element relative to the support element in a first direction so as to provide an actuation function; and, at least whilst the movable element starts to move in the first direction, driving the movable element such that it is moving in a second direction orthogonal to the first direction.

For the purposes of the present techniques, the second direction is considered to be orthogonal to the first direction if movement in the second direction does not change the position of the movable element in the first direction. Thus, movement in the second direction in question may be orthogonal by being linear movement in a direction perpendicular to the first direction and/or by being rotational movement about an axis perpendicular to the first direction.

Thus, in certain embodiments, the actuator assembly has a principal axis and the first direction is perpendicular to said principal axis and the second direction is rotation about an axis parallel to said principal axis.

By causing the movable element to move in the second direction, which is orthogonal to the first direction, the movable element can be kept in motion whilst the actuator is powered, thus meaning that any motion in the first direction caused by the SMA actuator is affected only by the dynamic coefficient of friction and any jitter can thus be reduced and preferably eliminated.

The bearing may be arranged to constrain movement of the movable element to directions in a predetermined plane.

In certain arrangements there may be a plurality of SMA actuator components and the step of driving the movable element may include contracting and/or relaxing one or more of said components. Thus the method may use actuator components which are different to those used to cause motion in the first direction to cause the motion in the second direction, or may use one or more actuator components which are the same as one or more of those used to cause motion in the first direction to cause the motion in the second direction.

There may be a predetermined maximum of total power that can be supplied to said components, and the method may further include the step of controlling the power supplied to the SMA actuator components such that if the power required to cause the desired movement in both the first and second directions exceeds said maximum, power is allocated preferentially to the component or components used to control movement in the first direction over the component or components used to cause the movable element to move in the second direction.

Thus the power budget of the actuator assembly can be managed and motion in the first direction (which is the desired motion) of the movable element can be prioritised over the jitter-reduction functionality.

In certain arrangements, the step of driving the movable element includes driving it such that it oscillates by moving in the second direction and a third direction opposite to the second direction. The third direction is also orthogonal to the first direction, such that the position of the movable element in the first direction is unaffected by this oscillatory motion. This may, for example, be lateral oscillatory motion or rotation oscillatory motion.

The frequency of said oscillation is preferably between 10-200 Hz and more preferably between 20-200 Hz.

Desirably the frequency of said oscillation is chosen so that it exceeds the frequency of the likely jitter. The frequency of jitter in typical bearings of the type used in SMA actuator assemblies is normally below 10 Hz and, in almost all situations, below 20 Hz.

Oscillation at too high a frequency will result in a reduction in the amplitude of the oscillatory motion due to a lack of time for the actuator components driving the oscillation to cool between each actuation. If the amplitude of the orthogonal/oscillatory motion is too low, the movable element may be effectively static relative to the bearing, or at least still within the domain in which the static coefficient of friction has an influence on the motion of the bearing, and thus the advantageous effects of the orthogonal/oscillatory motion may not be achieved or may be reduced.

Oscillatory motion may be beneficial as it allows for orthogonal motion of the movable element to be maintained over a relatively long period of time whilst only providing for a relatively small range of movement in the second and third directions. This may be particularly beneficial where the range of available movement is restricted, for example due to the design constraints on the apparatus, or due to the size and/or positioning of the actuators causing the motion in the second and third directions.

The method of this approach may include any combination of some, all or none of the above-described preferred and optional features.

A third approach of the present techniques provides an actuator assembly having: a support element; a movable element movable relative to the support element; an SMA actuator component connected between the movable element and the support element and arranged to cause movement of the movable element relative to the support element on contraction and/or relaxation of the actuator component; and a bearing arranged to guide the movement of the movable element, wherein the bearing includes two contact surfaces which are arranged to slide relative to each other when the movable element moves, and the bearing is configured such that its coefficient of static friction is substantially equal to its coefficient of dynamic friction.

By configuring the bearing such that its coefficient of static friction is substantially equal to its coefficient of dynamic friction (and preferably the two are identical), any motion of the movable element is subject to the same level of friction, whether the movable element is static or already in motion and any jitter can thus be reduced and preferably eliminated.

Substantially equal in the context of the present techniques encompasses arrangements with differences which are such that there is no material effect on the operation of the device. In certain configurations, the coefficients of static and dynamic friction may be within 10% of each other. In other configurations the coefficients may be within 5% of each other. Preferably the coefficients are within 1% of each other.

In one arrangement, the material of said contact surfaces is selected so that the static coefficient of friction between said surfaces is substantially equal to the dynamic coefficient of friction between said surfaces.

For example, in some embodiments the contact surfaces may be PTFE, POM (polyoxymethylene), PTFE-loaded POM, or phosphor bronze, either on both surfaces of the bearing, or on one surface of the bearing with the other being stainless steel. In other embodiments the bearings may be coated stainless steel, with the coating being, for example, diamond-like carbon (DLC) or treated DLC (e.g. CrC-DLC, Si-DLC, Cr-DLC or Ti-DLC), WC/C, TiAlN—WC/C or PTFE, again either on both surfaces of the bearing or on one surface of the bearing with the other being uncoated stainless steel.

In a further arrangement the actuator assembly may further include a lubricant arranged between said contact surfaces so as to cause said coefficient of static friction to be substantially equal to said coefficient of dynamic friction.

For example, the lubricant may be molybdenum disulphide or tungsten disulphide.

The apparatus of this approach may include any combination of some, all or none of the above-described preferred and optional features.

The present techniques may in general be applied to any type of device that comprises a static part and a moveable part which is moveable with respect to the static part. By way of non-limitative example, the actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, an autonomous vehicle (e.g. a driverless car), a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of example devices.

Actuator assemblies as described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Embodiments of the present techniques will now be described by way of example with reference to the accompanying drawings in which.

Figure 1:
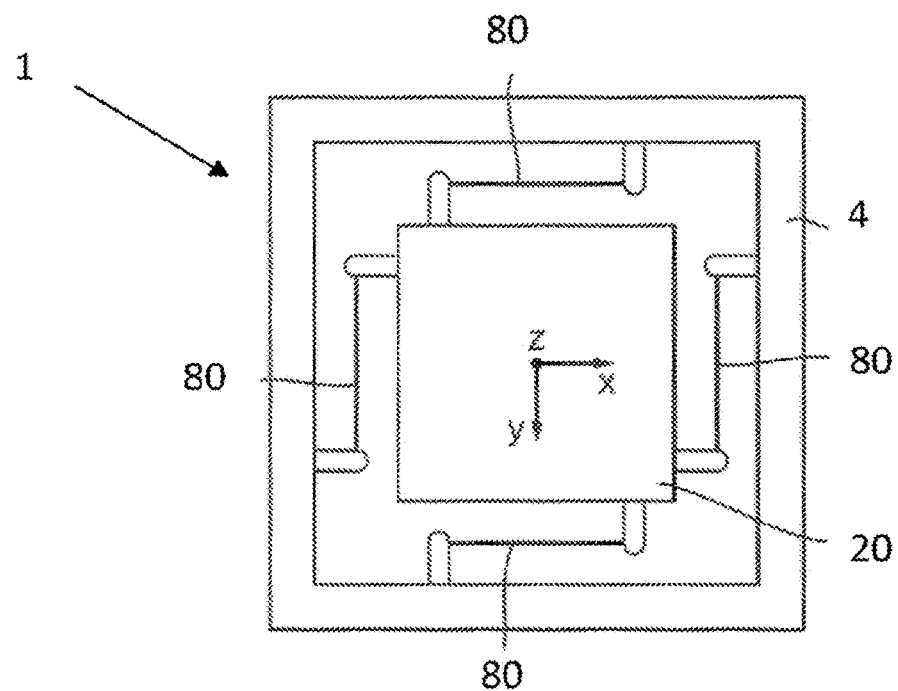
FIG. 1 shows a plan view of an actuator assembly according to embodiments of the present techniques.

Embodiments of devices according to the present techniques will now be described. Where similar or identical components are used in the different embodiments, they will be given the same reference numerals. For efficiency, description of similar or identical elements may not be repeated between the embodiments and characteristics and features of elements are to be understood as applying to those elements in all embodiments unless the description indicates otherwise.

FIG. 1 shows an actuator assembly 1 as viewed along a primary axis (referred to herein as the z-axis; in embodiments which are used in miniature cameras, this will often be the optical axis O). The actuator assembly 1 has a movable element 20 which is driven relative to a stationary portion 4 by a plurality of SMA actuator wires 80 forming an actuator arrangement 40. All of the embodiments described below have a similar structure to that shown in FIG. 1 when viewed along the primary axis.

Figure 2:
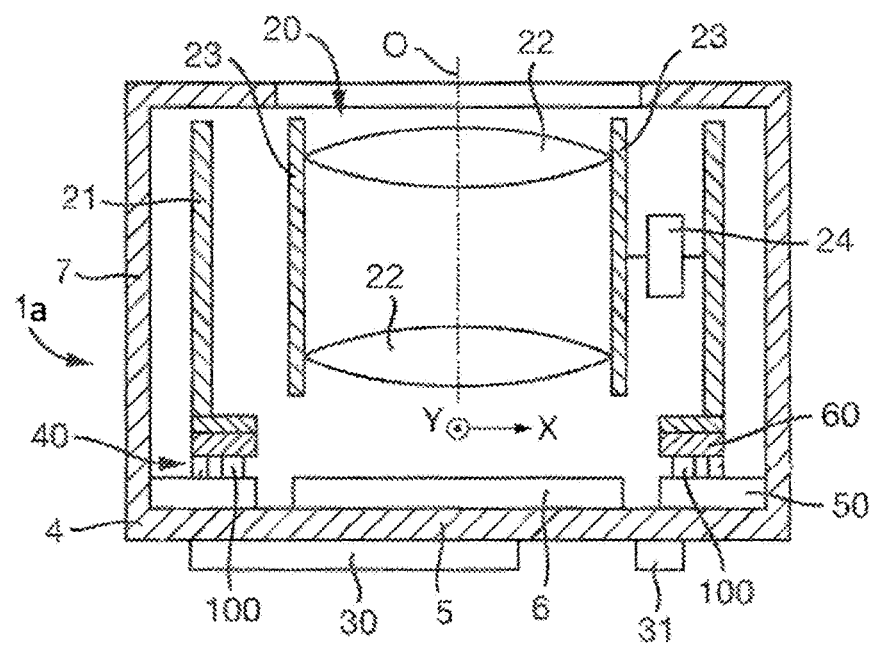
FIG. 2 shows a side view of an actuator assembly according to an embodiment of the present techniques.

FIG. 2 shows an actuator assembly 1a according to a first embodiment of the present techniques. The actuator assembly in FIG. 2 is the same as that shown in FIG. 1, but is viewed from the "side" (perpendicular to the z axis or the optical axis O as labelled).

In the embodiment shown in FIG. 2, the apparatus 1a is a camera apparatus in which the movable element is a camera lens assembly 20 which is suspended on a support structure 4 which forms the stationary portion. The mounting of the lens assembly allows movement of the lens assembly 20 relative to the support structure 4.

The support structure 4 is a camera support supporting an image sensor 6. The support structure 4 comprises a base 5, the image sensor 6 being mounted on the front side of the base 5. On the rear side of the base, there is mounted an integrated circuit (IC) chip 30 in which a control circuit is implemented. A gyroscope sensor 31 may also be mounted on the base 5, or alternatively it may be located elsewhere within the hand-held device of which the camera apparatus is a part. The support structure 4 also comprises a can 7 protruding forwardly from the base 5 to encase and protect the other components of the camera apparatus 1a.

The camera lens assembly 20 comprises a lens carriage 21 in the form of a cylindrical body supporting two lenses 22 arranged along the optical axis O, although in general any number of one or more lenses 22 may be provided. The camera apparatus 1 is a miniature camera in which the lens/lenses 22 have a diameter of at most 20 mm.

The lens assembly 20 is arranged to focus an image onto the image sensor 6. The image sensor 6 captures the image and may be of any suitable type, for example a CCD (charge-coupled device) or a CMOS (complementary metal-oxide-semiconductor) device.

In this arrangement, the lenses 22 are supported on the lens carriage 21 in a manner in which the lenses are movable along the optical axis O relatively to the lens carriage 21, for example to provide focusing or zoom functionality. In particular, the lenses 22 are fixed to a lens holder 23 which is movable along the optical axis O relative to the lens carriage 21.

Although all of the lenses 22 are fixed to the lens holder 23 in this example, in general one or more of the lenses 22 may be fixed to the lens carriage 21 and so not movable along the optical axis O relative to the lens carriage 21, leaving at least one of the lenses 22 fixed to the lens holder 23.

An axial actuator arrangement 24 provided between the lens carriage 21 and the lens holder 23 is arranged to drive movement of the lens holder 23 and lenses 22 along the optical axis O relative to the lens carriage 21.

In operation, the camera lens assembly 20 is moved orthogonally to the optical axis relative to the image sensor 6 with the effect that the image on the image sensor 6 is moved. This is used to provide optical image stabilisation (OIS), compensating for image movement of the camera apparatus 1a, caused by, for example, hand shake.

The apparatus 1a comprises a support plate 50 that forms part of the support structure 4 and is connected to the base 5. The SMA actuator arrangement 40 further comprises a moving plate 60. In this embodiment the moving plate 60 is the moving element, but it could equally form part of a movable element including other components. The moving plate 60 supports the camera lens assembly 20 and is connected to the lens carriage 21. The support plate 50 and the moving plate 60 are each integral sheets.

Drive signals for the SMA actuator wires 80 are generated and supplied by the control circuit implemented in the IC chip 30. The control circuit uses the output signals of the gyroscope sensor 31 which is a vibration sensor.

The apparatus 1a comprises one or more bearings 100 spaced around the optical axis O to bear the moving plate 60 on the support plate 50. In one arrangement, each bearing comprises a bearing member which separates the moving plate 60 and the support plate 50.

In one alternative the bearing member is fixed to the support plate 50, for example by adhesive. In this case the bearing member also bears on the moving plate 60. The surfaces of the bearing member and the moving plate 60 which bear on each other are planar, conforming surfaces which contact one another.

In another alternative, the bearing member is fixed to the moving plate 60, for example by adhesive. In this case the bearing member also bears on the support plate 50. The surfaces of the bearing member and the support plate 50 which bear on each other are planar, conforming surfaces which contact one another.

Thus, the contact between the conforming surfaces supports and bears the movable plate 60 on the support plate 50, allowing relative motion parallel to their extent, that is perpendicular to the optical axis O.

In the actuator assembly of FIG. 2, the materials of the bearing(s) 100 are chosen so that their coefficients of static friction and of dynamic friction between the surfaces of the bearings are substantially equal, i.e. similar, for example within 10%, preferably within 5% of each other, and preferably identical. For example, the bearings may be made from PTFE, POM (polyoxymethylene), PTFE-loaded POM, or phosphor bronze, either on both surfaces of the bearing, or on one surface of the bearing with the other being stainless steel. In other embodiments the bearings may be coated stainless steel, with the coating being, for example, diamond-like carbon (DLC) or treated DLC (e.g. CrC-DLC. Si-DLC, Cr-DLC or Ti-DLC), WC/C, TiAlN—WC/C or PTFE, again either on both surfaces of the bearing or on one surface of the bearing with the other being uncoated stainless steel.

Figure 3:
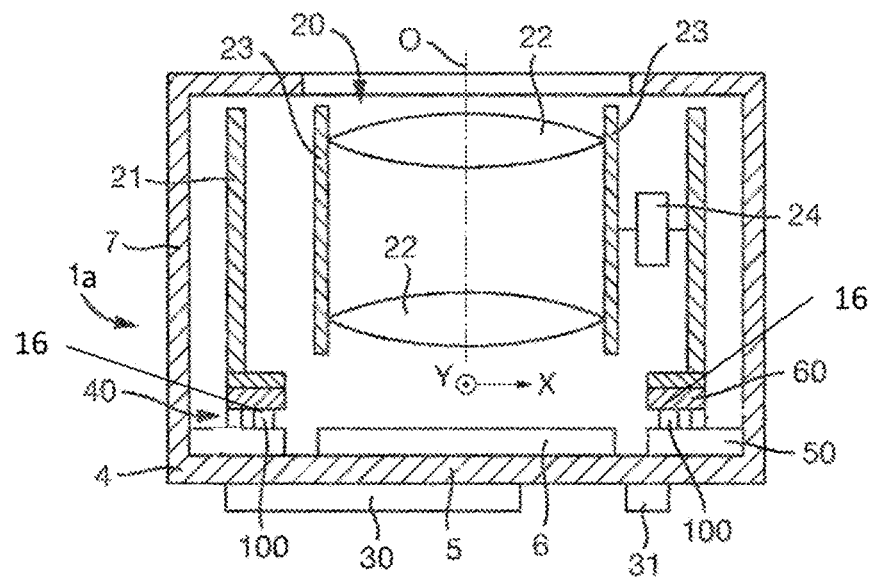
FIG. 3 shows a side view of an actuator assembly according to a further embodiment of the present techniques.

FIG. 3 shows an actuator assembly 1b according to a second embodiment of the present techniques. The actuator assembly 1b is configured in an identical fashion to the assembly shown in FIGS. 1 and 2 and the details will not be described further.

In the actuator assembly 1b of the second embodiment, a lubricant 16 is provided in the bearing(s) 100 which reduces the natural difference between the coefficients of static and dynamic friction between the moving surfaces of the bearing 100 and either the support plate 50 or the moving plate 60, depending on the bearing configuration (or alternatively the moving surfaces of the bearing where these are arranged to move relative to each other to guide the motion of the movable element 20). Preferably the lubricant is chosen and/or provided in such a quantity that the coefficients of static friction and of dynamic friction between the moving surfaces are substantially equal, i.e. similar, for example within 10%, preferably within 5% of each other, and preferably identical. For example, the lubricant may be molybdenum disulphide or tungsten disulphide.

Figure 4:
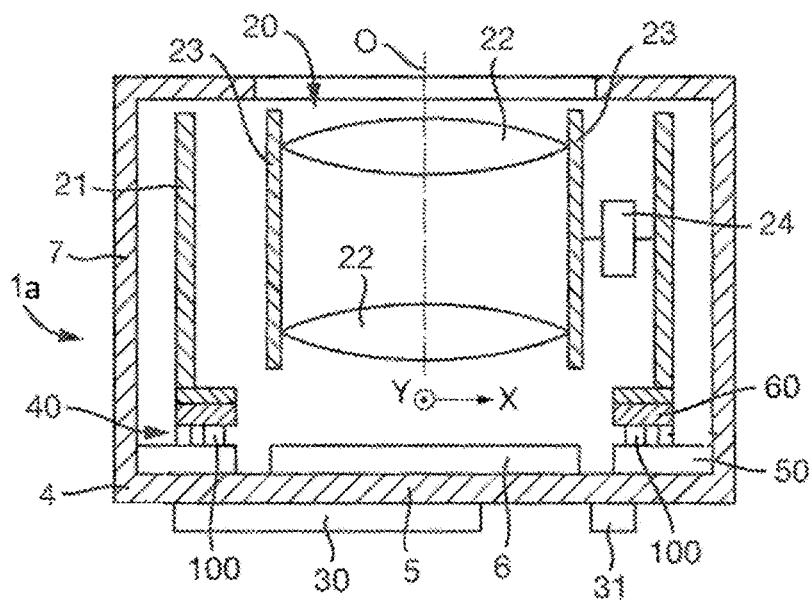
FIG. 4 shows a side view of an actuator assembly according to a further embodiment of the present techniques.

FIG. 4 shows an actuator assembly 1c according to a third embodiment of the present techniques. In the actuator assembly 1c shown in FIG. 4, the bearing(s) 100 are standard bearings (i.e. bearings of any known type), although they could also be bearings as described in relation to either or both of the above first and second embodiments. Control of the actuator wires 80 by the controller 30 is used to reduce and preferably eliminate the jitter.

To achieve this, the controller 30 is arranged to drive the actuator wires 80 so as to cause the movable element 20 to move in a direction orthogonal to the direction of desired movement just before, and at the same time as, driving the actuator wires 80 so as to cause the movable element to move in the direction of desired movement. This driving may be accomplished by driving of the actuator wires 80 in a different arrangement or combination to the combination used to cause movement in the direction of desired movement. Alternatively or additionally this driving may be accomplished by alternative driving of the movable element 20.

As a result, while the movable element 20 is static in the direction of desired movement, it is being driven in an orthogonal direction and is therefore in motion relative to the bearing(s) 100. This causes the coefficient of friction in the direction of desired movement to be the dynamic coefficient of friction, rather than the static coefficient of friction and thus the jitter can be reduced and preferably eliminated.

As an example, in the actuator assembly 1c shown in FIG. 4, the movable element can be moved in three orthogonal directions relative to the stationary portion 4: X, Y and rotation about the O-axis (Z-axis). By driving the movable element 20 to rotate about the Z-axis before and during driving desired motion in the X and/or Y directions, it is possible to ensure that the movable element 20 is moving before and during being driven in the desired direction.

In the example of a miniature camera, where the assembly is driving the motion of a lens element as the movable element, the assembly can perform an optical image stabilisation (OIS) function by moving the lens in the X and/or Y directions (defining a plane orthogonal to the Z axis, which is typically the optical axis). However, rotation about the Z axis nominally has no impact on the image and so is not of interest.

Jitter can also be observed in certain bearings when the actuator is required to hold a constant position (e.g. in the X and Y directions). This jitter typically has a period of around 50-100 ms. Using an actuator assembly such as that set out in the third embodiment above, the controller could be arranged to drive the actuator wires so as to cause the movable element to rotate about the Z axis in an oscillatory fashion. This oscillation could have a frequency of approximately 100 Hz and will reduce the jitter that is observed in the X and Y directions.

Except where the context requires otherwise, the term "bearing" is used herein as follows. The term "bearing" is used herein to encompass the terms "sliding bearing", "plain bearing", "rolling bearing", "ball bearing", "roller bearing" and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-planar bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

Although some of the above approaches have been described with specific reference to cameras and camera assemblies, it will be appreciated that the configuration and/or control of the actuator assemblies involved can be applied in other fields where control of an iris is desired.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An actuator assembly having:
a support element;
a movable element movable relative to the support element;
a shape memory alloy (SMA) component connected between the movable element and the support element and arranged to cause movement of the movable element relative to the support element;
a bearing arranged to guide the movement of the movable element; and
a controller arranged to control energy supplied to the SMA component to thereby cause contraction and/or relaxation of the SMA component and to control movement of the movable element relative to the support element in a first direction so as to provide an actuation function,
wherein the controller is arranged to, at least whilst the movable element starts to move in the first direction, control the movable element to cause it to be moving in a second direction orthogonal to the first direction.

2. The actuator assembly according to claim 1, wherein the SMA component is part of a plurality of SMA components and the controller is arranged to control the movable element to cause it to move in the second direction by causing contraction and/or relaxation of one or more of said SMA components.

3. The actuator assembly according to claim 1, wherein the actuator assembly has a principal axis and the first direction is perpendicular to said principal axis and the second direction is rotation about an axis parallel to said principal axis.

4. The actuator assembly according to claim 1, wherein the bearing is arranged to constrain movement of the movable element to directions in a predetermined plane.

5. The actuator assembly according to claim 1, wherein the controller is arranged to control the movable element to cause it to oscillate by moving in the second direction and a third direction opposite to the second direction.

6. The actuator assembly according to claim 5, wherein the frequency of said oscillation is between 10-200 Hz.

7. A method of controlling an actuator assembly, the actuator assembly having:
a support element;
a movable element movable relative to the support element;
a shape memory alloy (SMA) component connected between the movable element and the support element and arranged to cause movement of the movable element relative to the support element; and
a bearing arranged to guide the movement of the movable element,
wherein the method includes the steps of:
supplying energy to the actuator assembly to control movement of the movable element relative to the support element in a first direction so as to provide an actuation function; and,
at least whilst the movable element starts to move in the first direction, driving the movable element such that it is moving in a second direction orthogonal to the first direction.

8. The method according to claim 7, wherein the actuator assembly has a plurality of SMA components and the step of driving the movable element includes contracting and/or relaxing one or more of said SMA components.

9. The method according to claim 8, wherein there is a predetermined maximum of total power that can be supplied to said SMA components, and further including the step of controlling the power supplied to the SMA components such that if the power required to cause the movement in both the first and second directions exceeds said maximum, power is allocated preferentially to the component or components used to control movement in the first direction over the component or components used to cause the movable element to move in the second direction.

10. The method according to claim 7, wherein the actuator assembly has a principal axis and the first direction is perpendicular to said principal axis and the second direction is rotation about an axis parallel to said principal axis.

11. The method according to claim 7, wherein the step of driving the movable element includes driving it such that it oscillates by moving in the second direction and a third direction opposite to the second direction, and wherein the frequency of said oscillation is between 10-200 Hz.

12. An actuator assembly having:
a support element;
a movable element movable relative to the support element;
a shape memory alloy (SMA) component connected between the movable element and the support element and arranged to cause movement of the movable element relative to the support element on contraction and/or relaxation of the SMA component; and
a bearing arranged to guide the movement of the movable element,
wherein the bearing includes two contact surfaces which are arranged to slide relative to each other when the movable element moves, and the bearing is configured such that its coefficient of static friction is substantially equal to its coefficient of dynamic friction.

13. The actuator assembly according to claim 12, wherein the material of said contact surfaces is selected so that the static coefficient of friction between said contact surfaces is substantially equal to the dynamic coefficient of friction between said contact surfaces.

14. The actuator assembly according to claim 13, wherein at least one of the contact surfaces is PTFE, polyoxymethylene (POM), PTFE-loaded POM, phosphor bronze, stainless steel, or stainless steel coated with one of: diamond-like carbon (DLC), CrC-DLC, Si-DLC, Cr-DLC, Ti-DLC, WC/C, TiAlN-WC/C or PTFE.

15. The actuator assembly according to claim 12, further including a lubricant arranged between said contact surfaces so as to cause said coefficient of static friction to be substantially equal to said coefficient of dynamic friction.

* * * * *